United States Patent Office 3,264,121
Patented August 2, 1966

3,264,121
PRODUCTION OF DEHYDRATED MEAT
AND VEGETABLE SALADS
Justin M. Tuomy, Framingham, Mass., and Raymond G. Young, Chicago, Ill., assignors to the United States of America as represented by the Secretary of the Army
No Drawing. Filed Nov. 6, 1963, Ser. No. 321,980
2 Claims. (Cl. 99—204)

The invention described herein, if patented, may be used by or for the Government for governmental purposes without the payment to us of royalty thereon.

This invention relates to vacuum-freeze-dehydrated salads and to the production thereof.

The Armed Forces have for a long time experienced a need for taste-acceptable dehydrated salads to complement other dehydrated foods incorporated in rations, such as meat, egg, vegetable, fruit and other dehydrated foods. Many individuals prefer salads to other types of dishes, particularly in warm weather. It is a well-known fact that salads provide excellent sources of a variety of food products. It is important to the Armed Forces that a soldier find taste-acceptability in all of the food products furnished in his rations since any appreciable departure from the taste-acceptability of a given type of food product to which he is accustomed as a civilian may result in a great deal of waste due to discarding of the food, as well as a danger of malnutrition and physical inefficiency resulting therefrom.

It is accordingly an object of the present invention to provide vacuum-freeze-dehydrated salads in compact, space-saving forms which will rehydrate instantaneously or nearly instantaneously when treated with cold water and may be eaten either dry or in rehydrated form and which, when eaten in either form, will be highly acceptable tastewise.

Another object is the production of vacuum-freeze-dehydrated salads containing emulsion type food dressings which, when properly protected from oxygen and moisture in storage, will maintain their high consumer acceptability under adverse storage conditions.

Yet another object is the production of vacuum-freeze-dehydrated salad-type rations which will be edible, compact, high in caloric value and very nutritious under survival condition in any climate when eaten with or without prior rehydration.

Other objects and advantages of our invention will become apparent in the course of the following description of several examples of the practice of our invention.

The salads of the present invention are produced by mixing an emulsion type food dressing in certain proportions, which are critical to acceptability of the product, with either subdivided meat or subdivided vegetable or with combinations of subdivided meat and vegetable, and spices as desired. The meat is preferably precooked. The vegetable may be precooked, as for example in potato salad, or it may be blanched to inactivate the enzymes, or pickled, as for example in beet salad. A mixture of pickled vegetables, such as relish, may be incorporated in the salad. The emulsion type food dressing imparts the desired degree of plasticity to the mixture and gives the final product a desirable texture and mouth feel and high caloric value. The aforementioned spices are not essential ingredients, but may be added to the salad to enhance taste acceptability of the product. The salad mixture is vacuum-freeze-dehydrated to obtain the final product.

One of the outstanding problems of the prior art concerning the preparation of frozen salads or any other type of frozen food product containing mayonnaise or other emulsion type food dressings has been the tendency of the emulsion to break down under freezing conditions with resulting separation of the oil therefrom. Consequently, it was with great surprise that we discovered that salads containing emulsion type food dressings could be vacuum-freeze-dehydrated, when prepared with certain critical proportions of emulsion type food dressing, and subsequently rehydrated prior to being eaten, or while being eaten, and that the resultant food would retain a high degree of taste-acceptability (which term includes the mouth feel of the food being tested).

Wherever in this specification the expression "parts" is used to express proportions of ingredients, it is to be understood that the parts are by weight. Similarly, when moisture content is mentioned, it is to be understood that the percentage of moisture is expressed as percentage of the product based on weight.

The before-mentioned critical proportions of emulsion type food dressing in the salads of this invention range from approximately 4 parts per 100 total parts of salad in the case of salads containing high proportions of vegetable ingredients to approximately 20 parts per 100 total parts of salad in the case of salads containing relatively low proportions of vegetable, but high proportions of meat. If meat as well as vegetables are included in the salad, the emulsion type food dressing may be present in proportions between 4 and 20 parts per 100 total parts of salad, the proportion of emulsion type food dressing being determined by the relative proportions of vegetable and meat. It is inadvisable to employ less than 4 parts of emulsion type food dressing per 100 total parts of salad because emulsion type food dressings impart cohesiveness to the dehydrated blocks, which will usually crumble if less than this proportion of emulsion type food dressing is used. On the other hand, greater proportions of emulsion type food dressing than 20 parts per 100 total parts of salad will generally result in separation of the oil from the emulsion during processing and will, therefore, result in a less acceptable food product. These observations are based on long experience of the Armed Forces Food and Container Institute with taste panels and on the sampling of many individuals' reactions. It is not intended to suggest that proportions of emulsion type food dressing outside the limits stated would be completely inedible or non-nutritious, but trather that the physical state of such foods would be so poor and their taste-acceptability so low that from a military logistical point of view it would be impractical to furnish such products to soldiers.

It is to be understood that the term "emulsion type food dressing" includes any known commercial mayonnaise product, as well as food dressings of the emulsion type, having an oil content of from about 35% to about 80% or even higher in some cases.

The term "vegetable" as used herein includes any edible product obtained from a plant source, excluding known spices such as pepper, paprika, onion powder, dehydrated vinegar, and the like, which may be incorporated in any of the salads of this invention to enhance flavor. It is intended that pickle relishes, pickled beets, or other similar pickled vegetable products, as well as cooked diced onions that have not been previously dried, be included in the term "vegetable" as used herein.

The term "meat" as used herein includes any edible product obtained from an animal source. It includes not only the edible portions of warm-blooded animals, but also fish, shellfish, poultry, eggs, cheese, milk or milk solids.

In accordance with the invention, the meat and vegetable ingredients of the salad are preferably precooked in any desired and known manner. They are then cut, flaked, or otherwise subdivided into particles of a suitable size for making a salad, and then mixed with an emulsion type food dressing, and various spices to suit the taste. The mixed salad is then formed into individual cakes or small blocks of the desired shape of the final product and frozen. Alternatively, the salad may be frozen in a large block and the large block may then be sawed, while still frozen, into smaller blocks of the size and shape desired in the final product. The small blocks are then vacuum-freeze-dehydrated using any known and well-recognized vacuum-freeze-drying procedure. Convenient vacuum-freeze-drying conditions are obtained with a plate temperature of 110° F. and a vacuum of 750 to 1,000 microns, that is, an absolute pressure of 750 to 1,000 microns of mercury. If the absolute pressure exceeds 1,500 microns of mercury, inferior products are obtained. When the moisture content has been reduced to about 6% or less, and perferably to a value not exceeding about 2%, the blocks of dehydrated salad are hermetically sealed in cans or flexible containers in the absence of atmospheric oxygen (under an inert gas, such as nitrogen or carbon dioxide, or under vacuum). The product, packaged in this manner, can be stored for long periods of time at room temperature or higher and will retain its taste acceptability. When removed from the hermetically sealed cans or flexible containers, it can be eaten in its dry form much as a cracker or piece of dry toast might be eaten; or, if desired, it can be quickly rehydrated even in cold water by pouring a suitable amount of water over it in a bowl or pan and mixing the water with the salad for a few seconds, whereupon the salad rehydrates completely, provided enough water has been added. It is then ready for eating with a fork in the normal manner of eating salads. Most vacuum-freeze-dehydrated salads of this general type will be substantially fully rehydrated within about 10 to 20 seconds when blocks of about ½ inch thickness are mixed with the proper amount of water, regardless whether the water is cold or hot. With practice one can determine approximately what proportions of vacuum-freeze-dehydrated salad and water to mix and how long to stir a particular type of vacuum-freeze-dehydrated salad with the water to obtain the physical consistency in the rehydrated salad most desirable to him. Naturally the thicker the block of dehydrated salad, the longer the time required for penetration of water to the innermost portions of salad. When the dehydrated salad is eaten dry, it rehydrates very rapidly in the mouth since it is broken into very small particles and becomes thoroughly mixed with the saliva while being chewed.

Having described the general conditions under which the invention may be practiced, we will now disclose several specific examples of the production of vacuum-freeze-dehydrated salads containing emulsion type food dressings in accordance with the present invention. It will be understood, of course, that the above-enumerated and other objects of our invention may also be accomplished by the substitution of other types of meat and other types of vegetables, and by suitable variations of the detailed method steps, about to be set forth below, which are intended to be for illustrative purposes and not for the purpose of limiting the scope of our invention.

EXAMPLE I

*Potato salad, German style*

White potatoes were cooked by boiling until tender, but still firm. They were then diced and 15 lbs., 5 oz. of the diced potatoes were mixed with 14 oz. of cooked diced onions, ½ oz. onion powder, ⅛ oz. pepper, 1 lb., 2 oz. dehydrated vinegar, 4 oz. salt, 3 oz. sugar, 1 lb., 2 oz. of prefried and diced bacon, 3 oz. bacon fat, and 14 oz. of mayonnaise having an oil content of about 80% by weight. The order of addition of the ingredients is relatively immaterial. After being thoroughly mixed, the potato salad was cast into individual molds having internal dimensions of about 4 x 2½ x ½". The molds were provided with false bottoms so that by inverting the mold containing the salad, the salad could be removed from the mold onto a tray by pushing the false bottom to the opening in the mold. The molded blocks of salad on trays were subjected to deep freeze conditions in a blast freezer at —10° F. until frozen. They were then vacuum-freeze-dehydrated at 750 to 1,000 microns of mercury pressure with a plate temperature of 110° F. until their moisture content has been reduced to about 1.4%. The vacuum-freeze-dehydrated blocks of potato salad were packed in cans in a nitrogen atmosphere and hermetically sealed, and then stored for one year at 70° F. At the end of this storage period, the dehydrated potato salad was rehydrated by adding enough tap water to rehydrate the salad and stirring well for 15 seconds. The rehydrated potato salad was eaten with a fork in the normal manner and found to be highly taste-acceptable. Some of the blocks of dehydrated potato salad were eaten without prior rehydration and were also found to be highly taste-acceptable.

EXAMPLE II

*Tuna salad*

Fresh tuna fish was steam cooked, then chilled and drained. Then 7 lbs., 8 oz. of the cooked tuna fish was flaked and mixed with 1 lb., 12 oz. mayonnaise having an oil content of about 65% by weight, 2 oz. salt, and 1 lb. pickle relish. The resulting mixture was formed into small blocks and dehydrated in the same manner as the potato salad of Example I to a moisture content of about 0.7%. The vacuum-freeze-dehydrated blocks of tuna salad were packed in cans and sealed under vacuum in a conventional manner, and then stored for one year at 70° F. The cans were then opened and taste-tested for acceptability when eaten both dry (without prior rehydration) and after rehydration in the same manner as that employed for the potato salad of Example I. In both cases the vacuum-freeze-dehydrated tuna salad was highly acceptable.

EXAMPLE III

*Salmon salad*

Canned salmon was drained free of the juices in which it was canned and 8 lbs., 4 oz. of the drained salmon was flaked and mixed with 1 lb., 8 oz. of salad dressing having an oil content of about 40% by weight, 4 oz. cooked diced onions, and ⅛ oz. onion powder. The resulting salmon salad mixture was formed into small blocks, vacuum-freeze-dehydrated to a moisture content of about .5%, packaged, stored, and taste-tested in the same manner as the potato salad of Example I. The vacuum-freeze-dehydrated salmon salad was found to be highly acceptable when eaten dry or after rehydration with cold water as disclosed in Example I.

EXAMPLE IV

*Chicken salad*

Chicken was raw boned, then cooked in a form, then chilled and diced to a convenient size, e.g., ⅜ in. x ⅜ in. x ¼ in. Celery was blanched and then diced to a convenient size, e.g., ¼ in. x ¼ in. x ¼ in. Bacon was cut into small pieces and fried to a crisp state. Then 3 lbs. of cooked diced chicken, 9 oz. of blanched diced celery, 4.5 oz. of prefried bacon in small pieces, and 9 oz. of mayonnaise having an oil content of about 80% by weight were thoroughly mixed, then frozen at about —10° F. in a block. The frozen block was then sawed into smaller blocks having dimensions of about 4 x 2½ x ½". The small blocks were then placed on a tray while still frozen and were vacuum-freeze-dehydrated in the same manner as the potato salad of Example I to a moisture content of about 1.0%. The vacuum-freeze-dehydrated chicken salad was packed in cans in a nitrogen atmosphere and the cans were hermetically sealed and stored for a year at 70° F., then tested in the same manner as the potato salad of Example I. The vacuum-freeze-dehydrated chicken salad was found to be highly acceptable when eaten dry or after rehydration.

It will be understood that numerous variations can be made in the meat, vegetable, and flavoring or spice constituents of the present invention while maintaining the emulsion type food dressing within the above-stated critical proportions to the other constituents of the vacuum-freeze-dehydrated salads of the invention. Blanching of the vegetable may be necessary in some cases, as for example celery, in order to inactivate the enzymes present in the raw vegetable prior to incorporation of the vegetable in the salad mixture; otherwise, undesirable changes in texture and flavor may occur in the vacuum-freeze-dehydrated salad during long-term storage in the absence of oxygen.

It has been found advantageous to avoid flatus-producing foods in the vacuum-freeze-dehydrated salads produced in accordance with the present invention for use by the Armed Forces because these salads will frequently be supplied to personnel operating at pressures lower than atmospheric pressure, as for example in a space vehicle. Any flatus-producing tendency in the salads would tend to cause discomfort. However, it is to be understood that the invention is not limited to foods free of flatus-producing tendencies since there are stress situations in which a reasonable amount of flatus-producing food would be acceptable and since variety of available rations may outweigh in importance for some types of situations the elimination or minimizing of flatus-producing foods.

Although it has been stated above that the vacuum-freeze-dehydrated salads will preferably be produced with moisture contents not to exceed about 2% on a weight basis, it will be understood that in certain types of salads a higher moisture content in the vacuum-freeze-dehydrated salad will be acceptable, particularly for short-term storage at room temperature or at refrigerator temperatures. The pemissible amount of water in a dehydrated food depends on a number of factors. The susceptibility of the food to the growth of micro-organisms therein is one important factor, particularly where pathogenic micro-organisms are or may be involved. The conditions under which the food product is to be stored are important factors. When various foods are mixed, as in the vacuum-freeze-dehydrated salads of this invention, the moisture left in the product at the completion of vacuum-freeze-dehydration is substantially equilibrated throughout the product. Hence, it is necessary to establish a safe moisture level for each salad composition. Much depends on the conditions under which the vacuum-freeze-dehydrated salads will be stored. The preferred maximum moisture content of about 2% is for military rations, which are subjected to much more severe storage conditions than foods for civilian consumption.

An outstanding advantage of the present invention is that it provides foods of unusually high caloric density. Prior to this invention numerous attempts had been made to increase the caloric content of freeze dehydrated rations for feeding humans during space flights. The rations for this purpose produced by prior freeze dehydration procedures had as a maximum about 4.5 to 4.7 calories per gram. As a result of the present invention, it was found possible to produce highly acceptable freeze dehydrated salads having as high as about 5.9 calories per gram, an increase of about 25% in the caloric value over the prior rations of highest caloric density. The advantage of the vacuum-freeze-dehydrated salads of this invention over conventional undehydrated rations is even greater since the latter, such as beef stew, beefsteak, boned chicken, fried ham, and pork steaks, usually have a caloric density of about 1 to 2 calories per gram.

It will be apparent that the present invention provides a wide variety of salad-type food products having high caloric density and high taste-acceptability characteristics when eaten cold after quick rehydration with cold water, or when eaten dry. This invention solves a problem that has for a long time faced those who are responsible for developing rations for the military forces since practically all of the dehydrated meat and vegetable items which have been developed heretofore for military rations have either required rehydration with hot water in order to complete the rehydration within a reasonable length of time, or because of custom, are usually eaten while hot. Salads, on the other hand, are normally eaten cold. Furthermore, it has not been possible prior to the present invention to provide rations of the high caloric density which this invention makes possible without encountering serious difficulties in terms of oil or fat separation with resultant loss of acceptability. Hence, the present invention meets a long-standing need in the dehydrated food field for a highly acceptable, nutritionally well-balanced food of high caloric density which can be consumed without being heated.

It will be understood, of course, that the foregoing examples of the practice of our invention are for illustrative purposes and that the detailed instructions as to proportioning of ingredients and manipulative procedures may be varied within the skill of the expert in the art of food technology. These and other variations which will readily occur to the expert are thus included within the spirit and scope of our invention and subjoined claims.

We claim:
1. Process of preparing a dehydrated salad product comprising mixing an emulsion type food dressing selected from the group consisting of mayonnaise and salad dressing with an edible material selected from the group consisting of meat, vegetable, and a mixture of meat and vegetable to form a salad mixture, said edible material being subdivided, said meat being precooked and said vegetable having been heated sufficiently at last to inactivate the enzymes therein, said emulsion type food dressing comprising from about 4% to about 20% by weight of said salad mixture, freezing said salad mixture, and vacuum-dehydrating said salad mixture in its frozen state to a moisture content not exceeding about 6% by weight; whereby a readily rehydratable storage-stable salad product is obtained, which is rehydratable with cold water to produce a rehydrated salad comprising said food dressing in emulsified form capable of being eaten without being cooked after rehydration and having substantially the consistency and flavor of said salad mixture prior to dehydration.

2. Process according to claim 1, wherein said vegetable is cooked potato.

References Cited by the Examiner

UNITED STATES PATENTS 3,058,831   10/1962   Lorant _____ 99—209 X
3,083,108    3/1963   Kline et al. _____ 99—208
3,150,985    9/1964   Buscemi et al. _____ 99—208

OTHER REFERENCES

Berolzheimer: "Culinary Arts Institute Encyclopedic Cook Book," 1948, published by Culinary Arts Institute, Chicago, pages 326, 429, 538, 547, and 551.

A. LOUIS MONACELL, *Primary Examiner.*

HYMAN LORD, *Examiner.*